United States Patent

[11] 3,565,218

| [72] | Inventor | Kurt Franke<br>Bergen-Enkheim, Germany |
|---|---|---|
| [21] | Appl. No. | 784,866 |
| [22] | Filed | Dec. 18, 1968 |
| [45] | Patented | Feb. 23, 1971 |
| [73] | Assignee | Alfred Feves GMBH<br>Frankfurt Main, Germany<br>a corporation of Germany |
| [32] | Priority | Jan. 12, 1968 |
| [33] | | Germany |
| [31] | | T35677 |

[54] HYDRODYNAMIC DECELERATOR
1 Claim, 2 Drawing Figs.

[52] U.S. Cl. .................................................. 188/90,
60/54
[51] Int. Cl. ..................................................... F16d 57/00
[50] Field of Search ........................................... 188/90A,
90, 90A—5

[56] References Cited
UNITED STATES PATENTS

| 2,748,570 | 6/1956 | Booth ........................... | 188/90AX |
| 3,467,225 | 9/1969 | Steffen et al. ................. | 188/90AX |

*Primary Examiner*—Edgar W. Geoghegan
*Attorney*—Karl F. Ross

ABSTRACT: A hydrodynamic or hydrokinetic decelerator for a rotatable shaft has a rotor mounted on the shaft and a stator facing it and forming a fluid-circulating pump with it. This axially immobile stator is selectively decoupled from and coupled with the housing of the decelerator to be made stationary in the latter case, to allow braking action to take place, or rotates freely with the rotor when no braking is desired to minimize frictional power losses in the decelerator.

INVENTOR.
KURT FRANKE
BY
Karl F. Ross
ATTORNEY

HYDRODYNAMIC DECELERATOR

My present invention relates to a hydrodynamic or hydrokinetic decelerator and, more particularly to a decelerator for use in heavy-duty vehicles, such as in trucks, trams, buses and other rapidly moving, massive vehicular systems.

BACKGROUND OF THE INVENTION

Hydrodynamic or hydrokinetic decelerators generally consist of one or more decelerator stages each with a toroidal or cylindrical shell half forming a rotor connected with a rotatable shaft and a confronting similar shell half (forming the stator) mounted upon a support and defining an annular chamber or a plurality of segmental chambers with the rotary shell member. Hydraulic fluid in this chamber is pumped around by the coacting vanes of the rotary and stator members, and, in accordance with the pumping characteristics, the pressure or amount of the fluid within the chamber, etc. created more or less liquid friction to impede the shaft rotation. Thus the kinetic energy of shaft rotation (or vehicular movement) is converted into thermal energy which is dissipated.

It has been proposed to provide a hydrodynamic brake or decelerator in the driving train of an automotive vehicle, i.e. between the engine and the driven wheels, to act as an auxiliary decelerating or braking device in conjunction with the usual wheel brakes. In such systems, a rotary pumping member, i.e. the rotor connected with the drive shaft of the vehicle, displaces the hydraulic fluid along a closed path including a heat exchanger designed to dissipate the heat of the fluid produced by conversion of the kinetic energy of rotation of the shaft into kinetic energy of heat of the fluid. The resulting deceleration of the shaft is proportional to the amount of heat generated in the fluid.

In such systems, e.g. as has been described in commonly assigned U.S. Pat. Nos. 3,265,162 and 3,302,655 and in the commonly assigned copending applications Ser. Nos. 672,121, (U.S. Pat. No. 3,451,511, issued June 24, 1969) and 680,936 (U.S. Pat. No. 3,423,134, issued January 21, 1969) filed Oct. 2, 1967 and Nov. 6, 1967 by Wilhelm Knapp, the principle of operation and some advantageous constructions of hydrodynamic decelerators of this type are described and claimed. Thus it is important to recognize that a hydrodynamic brake is most effective at high vehicle speeds and may be brought into play prior to the mechanical wheel brakes of the vehicle to effect an initial slowdown at speeds at which the mechanical brakes are rapidly worn out and are of little effectiveness. However, at low vehicle speeds, the pumping efficiency falls off and the hydrodynamic decelerator plays a less significant role in the braking process. In fact, hydrodynamic decelerators alone are frequently incapable of bringing the vehicle to standstill. Thus it has been suggested to provide additional friction brakes in the decelerator housing and to use a differential valve responsive to the braking effectiveness of the hydraulic decelerator to bring the friction brakes at the wheels or decelerator housing into play.

For the most part, earlier decelerator structures have required a relatively large-diameter stator, mounted upon the vehicle frame or chassis, cooperating with a corresponding dimension rotor whose vanes or ribs cooperate to form the pump. The decelerator thus had the appearance of a torque converter with a crown of vanes, the hydraulic fluid being pumped from the central region of the decelerator chamber to the periphery thereof. The rotor was generally coupled to the power shaft, while the heat exchanger was a radiator designed to dissipate the thermal energy of braking into the atmosphere directly, e.g. with the cooperation of a fan inducing the flow of air through the radiator or the vehicle movement with similar effect, or a liquid/liquid heat exchanger indirectly dissipating this thermal energy. Heat-exchanger systems of the latter type make use of the cooling system of the internal-cumbustion engine by passing the coolant thereof through the liquid/liquid heat exchanger to take up the heat of hydrodynamic fluid and eventually dissipate it into the atmosphere through the radiator of the engine. A thermostatic switch may be provided at the heat exchanger to terminate the flow of cooling fluid therethrough when, because of the extent of braking or road conditions affecting driving, the engine is about to overheat.

It has also been found, as described in the aforementioned applications, that problems were encountered in hydraulic decelerator in which residual fluid in the pumping chamber was displaced by the rotor in spite of the fact that the rotor chamber was not intended to be charged with fluid and hydrodynamic braking was undesired. To this end, these systems provide a charging cylinder containing hydraulic brake fluid below a gas head which could be alternatively subjected to pressurization from a compressor or to negative pressure from the intake side of the compressor. When superatmospheric pressure is supplied to the charging cylinder, the hydrodynamic fluid is driven under pressure from the charging cylinder into the rotor chamber and substantially immediately becomes effective to produce hydrodynamic deceleration. When negative pressure is applied to the cylinder, however, the hydrodynamic fluid is withdrawn from the rotor chamber which is substantially completely drained to prevent undesirable pumping action.

It will be recognized that the effectiveness of the hydrodynamic decelerator is determined by the volume of the liquid pumped and the energy which is transferred to the liquid in the form of heat, i.e. by the amount of work done by the rotor in the liquid. The pumping capacity of the rotor, however, is dependent upon the speed of the power shaft, which must be held within the limited range of speeds practical for automotive vehicles, and the diameter of the rotor. As a result, it is necessary to increase the diameter (and, accordingly, the peripheral speed of the vanes) whenever increased hydrodynamic braking is desired. This provides a limitation of the use of hydrodynamic decelerators and brakes since increase in the volume of the decelerator is often precluded by design of the vehicle, may become prohibitive, or may result in interference with other functioning parts. Thus it may be stated that a recognized disadvantage of the known hydrodynamic brakes is their spatial requirements for a given decelerating action.

In accordance with the system of commonly assigned copending application Ser. No. 688,139 filed Dec. 5, 1967 (U.S. Pat. No. 3,489,252, issued Jan. 13, 1970) by Klein and Knapp, a hydraulic decelerator is adapted to circulate a liquid along a closed path to convert kinetic energy of rotation in the power train of a vehicle into kinetic energy of heat of the fluid and to dissipate such heat which has a pair of countermoving rotors driven in opposite senses and cooperating to increase the interaction of the rotor vanes with the liquid above the relationship characteristic of a single rotor device. According to a more specific feature of this application, the rotors are coaxial with one another and have interfittable arrays of vanes, preferably extending axially toward one another, each of the arrays being made up of angularly equispaced vanes, the arrays being radially offset from one another with respect to the axis of the device. It was found that an arrangement in which counterrotating interfitting arrays of vanes form the pump assembly permits hydrodynamic braking to a high degree with a much more compact configuration of the assembly. Moreover, the assembly permits the heat-dissipating means to be formed integrally with the pump unit. To this end, it provides a heat-conductive housing around the rotor which defines therewith a heat-exchange chamber through which a coolant is induced to flow in heat-transferring relationship with the liquid circulated by the pumping rotors. Thus the device comprises blower means, advantageously driven by the rotating shaft structure, to induce the flow of air through the cooling jacket or heat exchanger.

According to still another feature of this latter application, the rotor structures constitute piston-and-cylinder means for shifting the respective sets of vanes axially toward and away from one another to permit control of the effectiveness of the hydrodynamic brake. Also, the inner wall of the housing can be provided with vanes closely spaced with respect to the rotor assembly so as to form a diffuser structure through which the circulating liquid is forced to pass.

A system employing such a decelerator is also disclosed in the commonly assigned copending application Ser. No. 669,941 filed Sept. 22, 1967 by J. R. Botterill et al. and entitled "BRAKE SYSTEM" (U.S. Pat. No. 3,449,017, issued June 1, 1969).

One of the main problems of decelerators prior to those described in these applications, is that when they are not in use they nonetheless create a power loss for the shaft to which they are coupled. This is due to the presence of residual hydrokinetic-braking fluid, which often cannot be completely withdrawn from the decelerator; the air remaining in the decelerator which has replaced the withdrawn fluid also tends to have this slowing effect, especially at high speeds. Obviously such a power loss is undesirable.

OBJECTS OF THE INVENTION

It is therefore the primary object of my invention to provide an improved decelerator in which power losses are held at a minimum when no braking is carried out, and which is inexpensive and simple to manufacture.

Another object of this invention is to provide an improved hydrodynamic or hydrokinetic deceleration for vehicles which extends principles set forth in the last-mentioned copending application.

SUMMARY OF THE INVENTION

In accordance with a primary feature of my invention, a decelerator of the type generally described above, is provided with a stator having a freely rotatable member which, in its rotationally impeded state, forms the fluid-circulating pump with the rotor. Brake means of conventional design is provided to arrest, i.e. stop or greatly slow down, the rotation of this rotatable member when braking action is to be carried out in the decelerator.

In this way the rotatable member, in an ineffective condition of the decelerator is entrained along with the rotor, thereby practically eliminating relative motion and making for a minimal amount of power losses due to friction in the decelerator. When the decelerator is actuated for braking action, the brake means is actuated to arrest this axially fixed but rotatable stator member relative to a stationary member of the stator or to a housing or support, thereby allowing the decelerator to function in the usual manner to circulate the hydrokinetic or hydrodynamic liquid through the heat-dissipating heat exchanger.

BRIEF DESCRIPTION OF THE FIGURES

These and other features, objects and advantages of my invention will be described in greater detail hereinafter, reference being made to the drawing in which.

SPECIFIC DESCRIPTION

Figure 1:
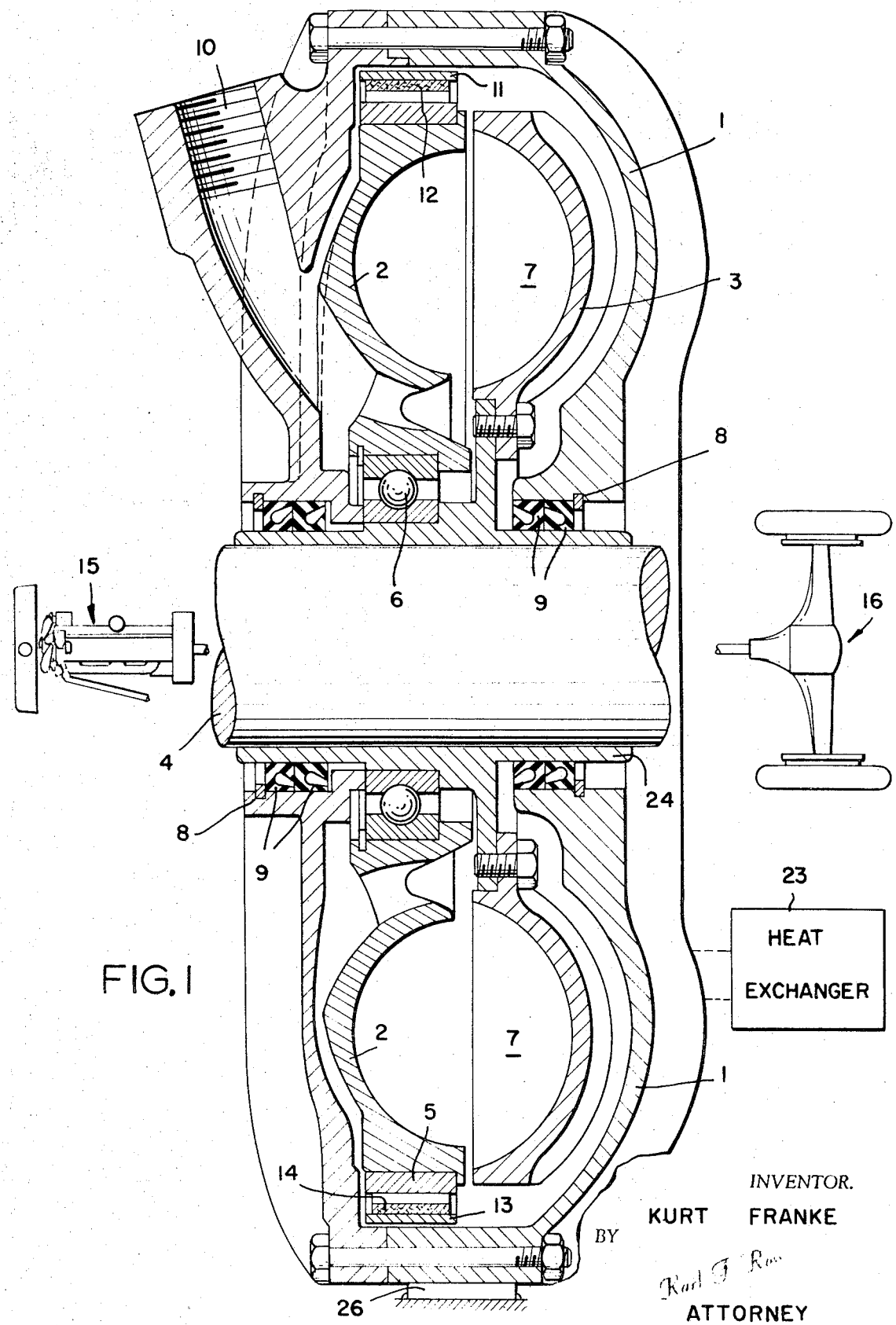
FIG. 1 is an axial cross-sectional view through a decelerator according to my invention.

As shown in FIG. 1, a housing 1 (enclosing an axis, not shown) on a support 26 of a heavy-duty vehicle has an inlet 10 through which fluid is admitted under pressure for decelerating action. A system for charging the decelerator with fluid and withdrawing the fluid is described in the above-mentioned copending Ser. No. 669,941.

A stator 2 is rotatably mounted via a bearing 6 on a flange portion or sleeve 24 of a rotor (rotatably entrained by the shaft 4). This flange portion 24 is keyed to a shaft 4 between a vehicle motor 15 and its rear end 16. Two bearing/sealing glands 9, held in place by a snap ring 8, seal each side of the housing 1 against fluid losses at the sleeve which extends to the opposite housing walls. Pump compartments 7 are formed between the stator 2 and rotor 3.

Circumferentially surrounding the stator 2 is a band 5 adapted to be engaged by brake linings 12 and 14 on respective C-shaped members 11 and 13 whose functioning is described hereinafter.

A heat exchanger 23 of conventional design is connected to the decelerator in a fluid-circulating path to dissipate the heat generated therein.

Figure 2:
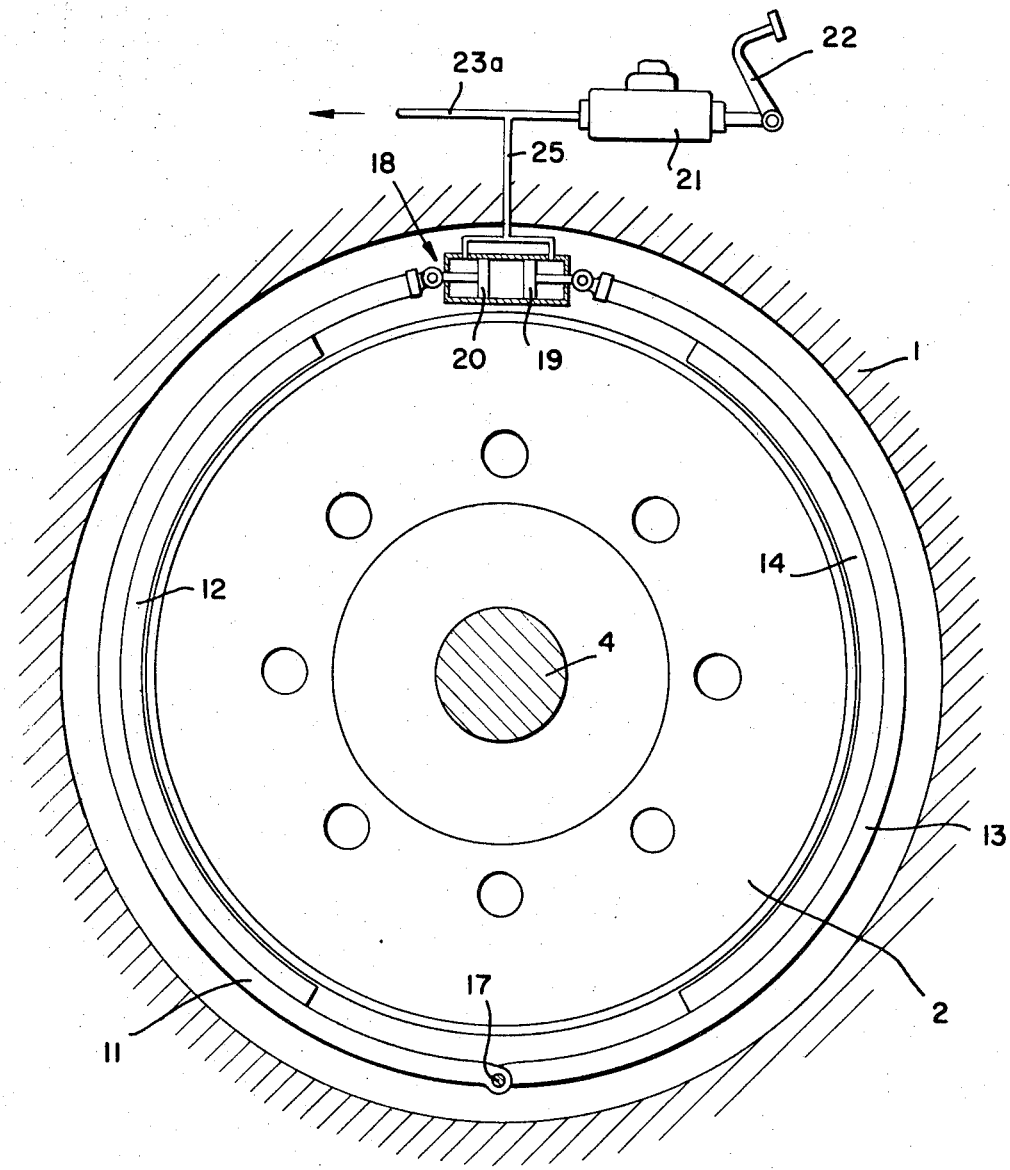
FIG. 2 is a substantially diagrammatic end view showing a brake means applicable to my invention.

As seen in FIG. 2 the two C-shaped members 11 and 13 are pivoted at 17 and are connected to respective pistons 20 and 19 in a cylinder 18. This cylinder 18 is connected via a line 25 to a master cylinder 21 operated by a brake pedal 22. A line 23a leads to a system serving to fill the decelerator with pressurized fluid. On actuation of the master cylinder 21, the two pistons 19 and 20 move together thereby bringing the linings 12 and 14 into contact with the band 5 on the stator 2 to arrest it relative to the stator housing and the vehicle chassis to initiate deceleration; other types of brakes which are usable with the stator 2, according to the invention, are shown in Mark's Mechanical Engineers' Handbook, edited by Theodore Baumeister (McGraw-Hill Book, Co., N.Y., 1964) on pages 8—52 ff.

Thus, when my decelerator is free running or in its ineffective condition, the compartments 7 are substantially empty and the stator 2 is freewheeling so that it assumes the speed and rotational sense of the rotor 3 as a result of power transfer by the residual fluid. The stator then turns with the rotor, eliminating relative motion and pumping action; thus, making for inappreciable power losses in the decelerator when the brake means is not actuated. As is obvious, this also obviates the necessity of providing additional equipment to fully drain the device.

However, on actuation of the brakes, fluid is forced into the decelerator at 10; at about the same time, the brake means——here the cylinder 18——is actuated to arrest the stator thereby allowing the whole device to function as a hydrodynamic decelerator or brake.

As can be seen, the bearing 6 for the stator 2 is mounted on the flange portion 24 of the rotor 3. In this manner, in an ineffective condition of the decelerator when the stator 2 and the rotor 3 rotate at substantially the same speed, the bearing 6 will wear to only a very slight extent if at all. It will only be worn during actuation of the decelerator.

The improvement described and illustrated is believed to admit of many modifications within the ability of persons skilled in the art, all such modifications being considered within the spirit and scope of the invention except as limited by the appended claims.

I claim:

1. A hydrodynamic decelerator for a shaft rotatable relatively to a support in the power train of an automotive vehicle having a hydraulic brake system, said decelerator comprising a housing enclosing an axis and mounted on said support; a rotor rotatably entrained by said shaft and received in said housing; a stator received in said housing, said rotor including a sleeve received in said housing and extending axially there within to axially-opposite housing walls and sealed at said walls with respect to said housing; a bearing mounted on said sleeve and rotatably carrying said stator, said stator and said rotor being mutually concave to define between them at least one pumping chamber, said stator and said rotor defining with said housing at least one fluid-receiving chamber, said stator being formed with openings communicating between said chambers and with a cylindrical outer periphery; a band-type brake surrounding said periphery and engageable therewith upon tightening of the brake; hydraulic cylinder means on said housing coupled with said band-type brake; means connecting said hydraulic cylinder with said hydraulic brake system for actuation thereby; and heat-exchanger means connected with said chambers for dissipating hydrodynamic braking energy converted to heat of a fluid received in said chambers.